W. D. FORSYTH.
TRUCK SIDE FRAME FOR CARS.
APPLICATION FILED JULY 16, 1909.
996,629.
Patented July 4, 1911.
2 SHEETS—SHEET 1.
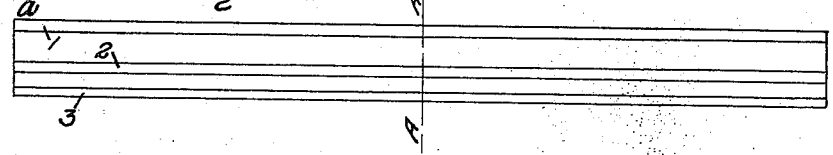
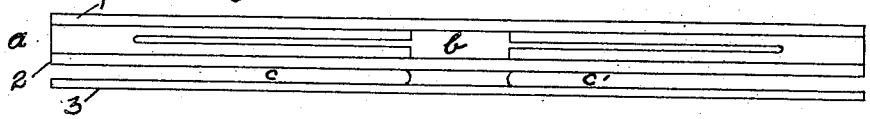
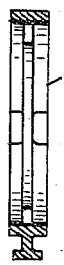
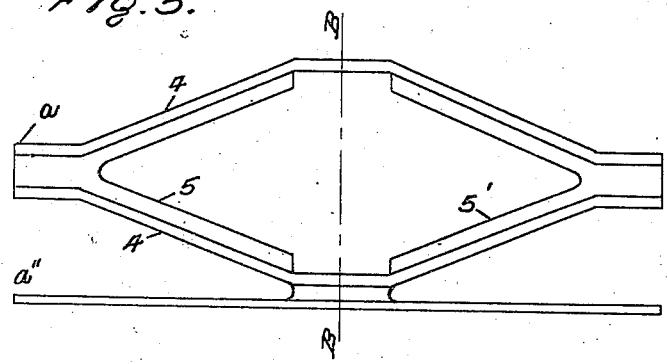
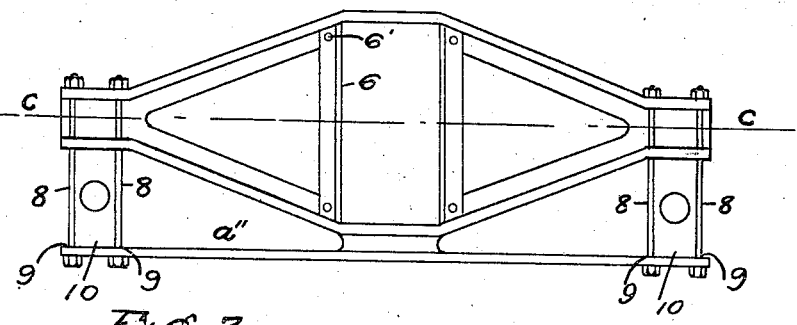
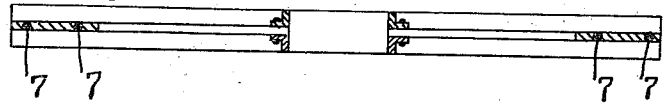
WITNESSES
INVENTOR W. D. FORSYTH.
TRUCK SIDE FRAME FOR CARS.
APPLICATION FILED JULY 16, 1909.
996,629.
Patented July 4, 1911.
2 SHEETS—SHEET 2.
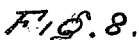
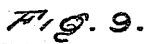
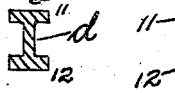
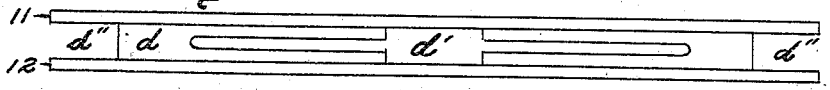
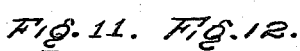
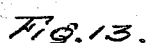
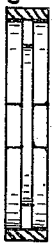
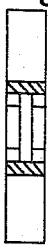
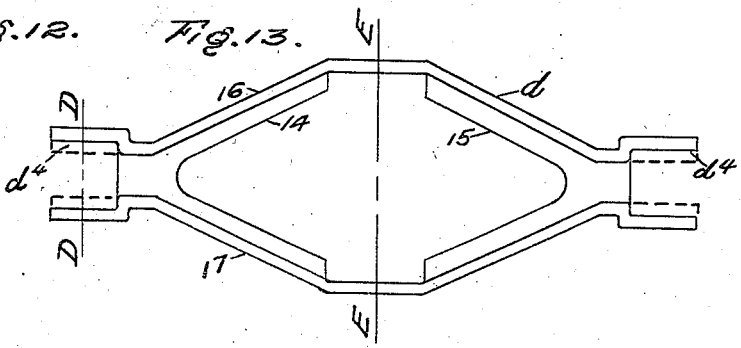
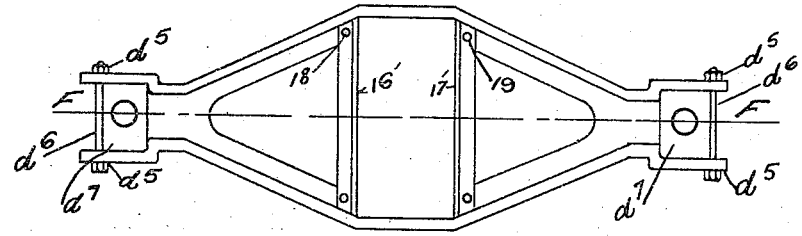
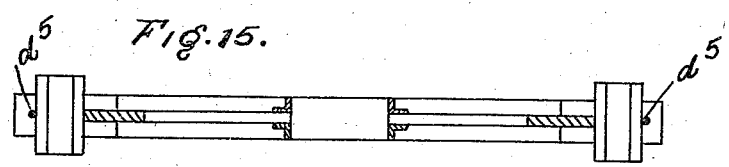
WITNESSES
INVENTOR

UNITED STATES PATENT OFFICE.

WILLIAM D. FORSYTH, OF YOUNGSTOWN, OHIO, ASSIGNOR, BY MESNE ASSIGNMENTS, TO A. M. NEEPER, OF PITTSBURG, PENNSYLVANIA.

TRUCK SIDE FRAME FOR CARS.

996,629.  Specification of Letters Patent.  Patented July 4, 1911.

Application filed July 16, 1909. Serial No. 507,933.

*To all whom it may concern:*

Be it known that I, WILLIAM D. FORSYTH, residing at 310 Madison avenue, in the city of Youngstown, in the county of Mahoning and State of Ohio, have invented a new and useful Improvement in Truck Side Frames for Cars; and I do hereby declare the following to be a full, clear, and exact description thereof.

My invention consists in a metal bar of peculiar cross-section properly machined and expanded, together with proper bracing members, bearings and bolts, all forming a truck side-frame; and the object of my improvements is to provide a truck side-frame which shall have ample strength and minimum weight at the lowest practical cost.

In the accompanying drawings, which illustrate my invention and the apparatus for and method of making the same, like figures of reference refer to like parts throughout.

Figure 1 is a cross section of the rolled bar or shape from which my improved truck side frame is made and is a section of Fig. 2 on line A—A. Fig. 2 is a side elevation of said rolled bar or shape. Fig. 3 is a side elevation of said rolled bar or shape with certain portions of the same punched from its web between the upper and middle flanges and between the middle and lower flanges. Fig. 4 is a vertical cross section on the line B—B of Fig. 5. Fig. 5 is a side elevation of Fig. 3 expanded in shape of my improved truck side frame. Fig. 6 is a side elevation of my improved truck side frame with a journal box bolted to it at each end with angle bar reinforcements applied to it at its largest opening. Fig. 7 is a longitudinal cross section of Fig. 6 on line C—C. Fig. 8 is a cross section of a variation of a rolled shape used to make a modification of my improved truck side frame omitting the tie rod therefrom as shown in Figs. 4 to 6, both inclusive, and is a cross section of Fig. 9. Fig. 9 is a side elevation of the rolled bar shown in cross section in Fig. 8. Fig. 10 is a side elevation of Fig. 9 with certain portions of the web cut away. Fig. 11 is a section of Fig. 13 on line E—E. Fig. 12 is a section of the end of Fig. 13 on line D—D. Fig. 13 is Fig. 10 expanded to the shape of my improved truck side frame at its median line and at both ends to connected journal boxes. Fig. 14 is a side elevation of my improved truck side frame without the tie rod shown in Figs. 5 and 6. Fig. 15 is a longitudinal view of Fig. 14 on line F—F.

A suitable billet, preferably of steel, is rolled to form a ribbed or flanged bar $a$ Figs. 1 and 2 or $d$ Figs. 8 and 9. Taking the construction shown in Figs. 1 to 7 inclusive, the bar shown has a web, upper flanges 1, lower flanges 3 and intermediate flanges 2. The sizes and proportions of these parts will depend upon the type, size and duty of the car into whose construction the truck frames enter. The bar is then cut to proper length, and the web is punched out on the proper lines as indicated in Fig. 3. An irregular aperture, $b$, is formed in the web between the flanges 1 and 2, and slots $c$ and $c'$ are formed between the flanges 2 and 3. When the bar $a$ has been thus slotted, it is placed in a proper forming die, the upper flanges 1 are separated from the intermediate flanges 2, at their middle portions, the ends of these flanges retaining their previous distance, being connected by the web. At the same time the equally inclined members 4 are produced, stiffened by the web-members 5. The lower flanges 3 now constitute the tie rod $a''$. The result is a one-piece truck side-frame having all parts integral with each other, having continuous tension and compression members, and having the metal properly distributed to give the greatest strength for the weight.

In Figs. 6 and 7 are shown the braces 6 attached to the upper and lower webs 5 and 5′, at the points where they are bent, by means of rivets 6′, or they may be electrically welded into place. These braces hold the side-frame in proper form. The holes 7 through the flanges 4 and webs 5—5′ and holes 9 through the tie-rod $a''$ may be drilled for the bolts 8, to hold the journal boxes 10 in position. The diagonals 4 will transmit the upward thrust of the journal boxes to the bolster, the tie rods $a''$ serving to prevent the lower faces of the boxes from swinging outward. As the flanges 1, 2 and 3 are continuous, their strength is greater than in a similar construction formed by riveting structural members together.

A different form of my improved one-piece truck side-frame is shown in Fig. 14, formed from the bar $d$ in Fig. 9. This bar is first machined, the irregular $d'$ being cut in the web intermediate its ends and the web itself cut away at the ends of the bar at $d''$, between the flanges 11 and 12. The middle portions of the flanges 11 and 12 are then separated by proper devices and the ends of the webs offset, as shown in Fig. 13, a distance $d^4$ to receive the journal boxes $d^6$, which may be held in position by bolts $d^5$. Braces 16' and 17', attached by means of rivets 18 and 19, hold the truck-side-frame in proper form and also furnish means for connecting to the truck bolster. In this construction as in the one previously described, the strong diagonal members extend from the upper and lower side of the bolster to the journal boxes. In both cases the side-frame is deep and extremely stiff, and in both the maximum amount of metal is placed in the diagonals which transmit the stress from the bolster to the boxes. The lighter members $a''$, 6 and 16' are in tension and serve to hold the frame in form. The heavy members take the load directly. The horizontal members, between the upright braces, are entire and integral with the diagonals, no portion being cut and then patched. As none of the metal is stretched, there are no broken fibers.

Having now explained my construction, what I claim as my invention and desire to secure by Letters Patent is:—

1. A car-truck side-frame comprising webs and three continuous lateral flanges on each side of the webs connected by the same at intervals, all the flanges being parallel to each other at their middle portions and at their ends, the middle of the upper flanges being separated from the intermediate flanges to admit a car bolster, the ends of the upper and intermediate flanges being connected by webs, the middle of the lower flanges being connected to the intermediate flanges by a web and the ends of said flanges being separated to admit car-axle boxes.

2. A car truck side frame formed from a bar having a slitted web and three longitudinal flanges on each side of the web, the flanges being bent at proper points to form upper, lower and intermediate frame-members parallel to each other at their middle portions and ends, the ends of the upper and intermediate bars and the middle portions of the intermediate and lower bars being respectively integral with each other, portions of the upper and intermediate bars being inclined to admit a car-bolster between the bars.

3. A car truck side frame formed from a bar having a slitted web and three longitudinal flanges on each side of the web, the flanges being bent at proper points to form upper, lower and intermediate frame-members parallel to each other at their middle portions and ends, the ends of the upper and intermediate bars and the middle portions of the intermediate and lower bars being respectively integral with each other, portions of the upper and intermediate bars being inclined to admit a car-bolster between the bars, and upright braces connecting the upper and lower flanges at the points where they are bent.

4. A car-truck side-frame formed from a rolled-steel bar and comprising webs and continuous lateral flanges on each side of the webs connecting the same at intervals, the flanges being bent so that at their middle portions and at their ends they are in parallel planes, the flanges being separated at their middle portions to admit a car-bolster, and connected at their ends by webs, the ends of the flanges being formed to be secured to car-axle boxes, and upright braces connecting the flanges at the ends of the middle parallel portions.

5. A car-truck side-frame of rolled steel having integrally connected continuous upper, intermediate and lower flanges, said intermediate and lower flanges being parallel and connected to each other at their middle portions and parallel to and separated from each other at their ends, said upper flange being parallel to and separated from the intermediate flange at their middle portions and parallel and connected to the same at their ends, and vertical braces connected at their ends to said upper and intermediate flanges at the ends of their middle parallel portions to inclose an opening for a car bolster.

In testimony whereof, I, the said WILLIAM D. FORSYTH, have hereunto set my hand, this 13th day of July, 1909.

WILLIAM D. FORSYTH.

Witnesses:
 A. M. NEEPER,
 M. E. THOMAS.

---

Copies of this patent may be obtained for five cents each, by addressing the "Commissioner of Patents, Washington, D. C."